US008719134B1

(12) United States Patent  
Huls et al.

(10) Patent No.: US 8,719,134 B1
(45) Date of Patent: May 6, 2014

(54) INSURANCE RATING PLAN

(71) Applicant: Allstate Insurance Company, Northbrook, IL (US)

(72) Inventors: Eric Huls, Northbrook, IL (US); Carolyn Parker, Libertyville, IL (US); David MacInnis, Flemington, NJ (US); David Chudzicki, San Francisco, CA (US); Pradraic Sheerin, Dungiven (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/722,044

(22) Filed: Dec. 20, 2012

Related U.S. Application Data

(60) Provisional application No. 61/593,615, filed on Feb. 1, 2012.

(51) Int. Cl.
*G06Q 40/00* (2012.01)

(52) U.S. Cl.
USPC .................................................. 705/35; 705/4

(58) Field of Classification Search
USPC .................................................. 705/4, 35–40
See application file for complete search history.

(56) References Cited

U.S. PATENT DOCUMENTS

| | | | |
|---|---|---|---|
| 7,343,310 | B1 | 3/2008 | Stender |
| 7,870,010 | B2 | 1/2011 | Joao |
| 2002/0010601 | A1 | 1/2002 | Taylor |
| 2005/0044050 | A1 | 2/2005 | Hendrickson et al. |
| 2006/0116915 | A1 | 6/2006 | Colessides et al. |
| 2007/0136109 | A1 | 6/2007 | Yager et al. |
| 2007/0150319 | A1 | 6/2007 | Menendez |
| 2008/0077448 | A1 | 3/2008 | Diamond |
| 2008/0091476 | A1 | 4/2008 | Graff |
| 2008/0235064 | A1* | 9/2008 | Gulko et al. ............. 705/4 |
| 2009/0112634 | A1 | 4/2009 | Koziol |
| 2010/0042442 | A1 | 2/2010 | Seitomer et al. |
| 2010/0241463 | A1 | 9/2010 | Corben et al. |
| 2011/0022416 | A1 | 1/2011 | Bergquist et al. |

OTHER PUBLICATIONS

Grace, Martin F. et al., Homeowner's Insurance with Bundled Catastrophe Coverage, Journal, Sep. 2004, pp. 351-379, vol. 71, Issue 3, The Journal of Risk and Insurance.
Birmbaum, Birny, Insurer's Use of Credit Scoring for Homeowner's Insurance in Ohio, Report, Jan. 2003, 35 pages, Report to the Ohio Civil Rights Commission Insurance Credit Scoring.

(Continued)

*Primary Examiner* — Thu Thao Havan
(74) *Attorney, Agent, or Firm* — Banner & Witcoff, Ltd.

(57) ABSTRACT

A first amount of insurance may be determined for a first set of at least one insured entities covered under a single insurance policy. Replacement cost factor data relating to the single insurance policy may be received from at least one source. Received replacement cost factor data may be used to determine a first replacement cost for the first set of at least one insured entities covered under the single insurance policy. A determination may be made that the first amount of insurance is greater than the first replacement cost. A first insurance premium may be calculated for the single insurance policy using at least the first amount of insurance and the first replacement cost. The calculated insurance premium may be less than a second insurance premium for a second set of at least one insured entities for which a second amount of insurance and a second replacement cost are both equal to the first amount of insurance.

20 Claims, 3 Drawing Sheets

(56) References Cited

OTHER PUBLICATIONS

MacDonald, Don N., et al., Flood Hazard Pricing and Insurance Premium Differentials; Evidence from the Housing Market, Journal, 1990, pp. 654-663, vol. 57, Issue 4, The Journal of Risk and Insurance.

Unknown Author, Statement to NOW at PBS, Public Broadcasting Service (PBS) [Internet]: http://www.pbs.org, (accessed Mar. 8, 2011).

* cited by examiner

INSURANCE RATING PLAN

CROSS-REFERENCE TO RELATED APPLICATIONS

This application is related to U.S. application Ser. No. 13/722,037, which is being filed concurrently with this application and which is herein incorporated by reference in its entirety. This application claims priority to U.S. Provisional Application No. 61/593,615, filed Feb. 1, 2012, and entitled "Insurance Rating Plan," the entire disclosure of which is hereby incorporated by reference in its entirety.

FIELD

Aspects of the disclosure relate generally to insurance. More particularly, the disclosure relates to a system and method for determining insurance premiums.

BACKGROUND

Generally, insurance premiums are calculated based on a number of factors, including the likelihood of damage to or loss of an insured item (based on risk factors) and the amount of insurance coverage for an insured entity. In some cases, the amount of insurance coverage is the maximum amount that will be paid out in the event of loss or damage to an insured entity. In some instances, payments above the amount of insurance can be paid out if certain circumstances are present.

In some instances, the amount of insurance coverage for an entity can be set based on a replacement cost of an insured entity. For example, an amount of insurance for a car covered under an insurance policy can be set at the replacement cost for the car. The replacement cost can be the average market value of a car of the same make, model, year, and mileage. In some cases, a purchaser of an insurance policy is allowed to indicate an amount of insurance for an insured entity. In some instances, a purchaser may indicate an amount of insurance that is greater than a replacement cost for an insured entity. For example, mortgage holders for homes or other buildings may require a home/building owner to purchase enough insurance to cover the amount remaining on the mortgage, which can be greater than the replacement value of a home or building.

In some instances, an insurance purchaser may select an amount of insurance that is greater than a replacement cost for an insured entity for increased peace of mind. Additionally, a purchaser may select an amount of insurance that is greater than the replacement cost for an insured entity so that fluctuations in replacement costs do not have to be closely monitored. If the amount of insurance selected is significantly greater than the replacement cost for an insured entity, there is likelihood that the replacement cost may not exceed the amount of insurance as the replacement cost changes over time.

In many cases, when an amount of insurance for an insurance policy is greater than a replacement cost for an insured entity, the amount paid out for total loss of the insured entity is the replacement cost, and not the amount of insurance. This indicates that insurance policy holders may not be receiving additional benefits for the amount of insurance that exceeds the replacement cost of an insured entity and are therefore paying additional insurance premium costs for a benefit that may not likely be fully realized.

Therefore, there is a need in the art for systems, apparatuses, and methods for improved insurance premium determination, including means for determining insurance premiums to better reflect the true benefit of an amount of insurance that exceeds the replacement cost for an insured entity. Various aspects of the disclosure overcome deficiencies and limitations of the prior art.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, systems and methods for determining an insurance premium for an insurance policy are disclosed. The insurance premium may be determined based on a replacement cost associated with an insured entity and an amount of insurance for the insured entity.

In some embodiments in accordance with aspects of the disclosure, a method of determining an insurance premium may include determining a first amount of insurance for a first set of at least one insured entities covered under a single insurance policy. The method may include receiving replacement cost factor data relating to the single insurance policy from at least one source. Received replacement cost factor data may be used to determine a first replacement cost for the first set of at least one insured entities covered under the single insurance policy. A determination may be made that the first amount of insurance is greater than the first replacement cost. In response to this determination, a first insurance premium may be calculated for the single insurance policy using at least the first amount of insurance and the first replacement cost. The calculated insurance premium may be less than a second insurance premium for a second set of at least one insured entities for which a second amount of insurance and a second replacement cost are both equal to the first amount of insurance. In some embodiments in accordance with aspects of the disclosure, the calculated insurance premium may be greater than a third insurance premium for a third set of at least one insured entities for which a third amount of insurance and a third replacement cost are both equal to the first replacement cost.

In some embodiments in accordance with aspects of the disclosure, a device for performing some or all parts of the aforementioned method is disclosed. The device may comprise an input device, an output device, a memory unit, and a processing unit. In some embodiments, the device may communicate with an internal database and/or external database. One skilled in the art will appreciate that one or more of the aforementioned methods and features may be embodied as computer-executable instructions stored on a computer-readable medium and executed by a processor.

Other features and advantages of the disclosure will become apparent to those skilled in the art upon review of the following detailed description, claims and drawings in which like numerals are used to designate like features.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

Figure 1:
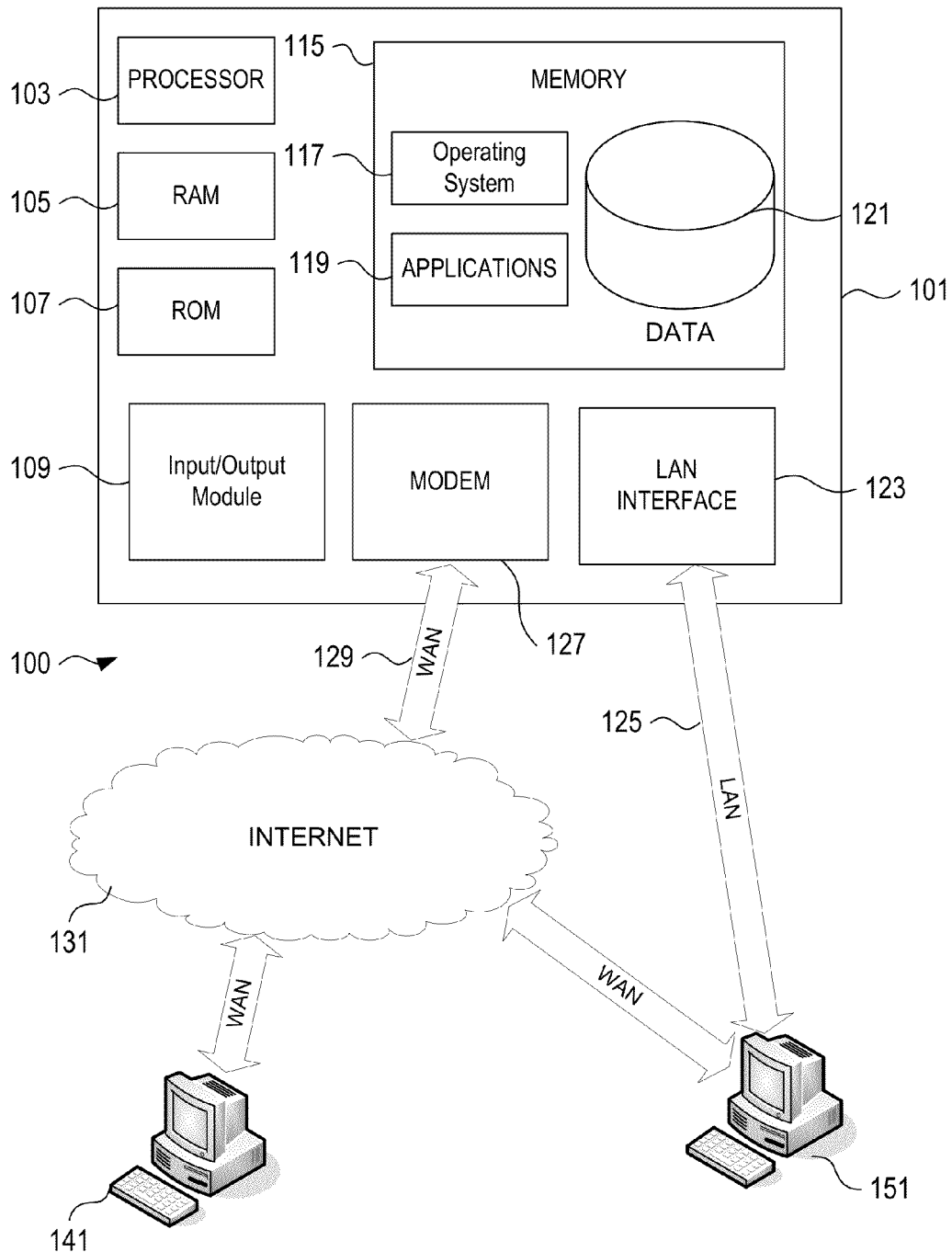
FIG. 1 shows an illustrative operating environment in which various aspects of the disclosure may be implemented.

Although embodiments of various aspects of the invention are disclosed, the invention is not limited in its application to the specific implementations set forth in the following description or illustrated in the drawings. The invention is contemplated to be practiced and carried out in various ways. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

As stated above, there are problems associated with determining insurance premiums for insurance policies for which an amount of insurance is greater than a replacement cost of an insured entity such that the insurance premium reflects the true benefit of the amount of insurance that is greater than the replacement cost. An insured entity can be a home, commercial building, land, other property, vehicle (e.g., automobile, boat, motorcycle, snowmobile, etc.), furniture, appliance, electronic device (e.g., TV, computer, cellular phone) jewelry, personal items, or any other item that is covered by an insurance policy. Aspects of the disclosure discussed below describe systems and methods for more accurately determining insurance premiums.

FIG. 1 illustrates a block diagram of an insurance premium determination control unit 101 in communication system 100 that may be used according to an illustrative embodiment of the disclosure. The insurance premium determination control unit 101 may have a processor 103 for controlling overall operation of the insurance premium determination control unit 101 and its associated components, including RAM 105, ROM 107, input/output module 109, and memory 115.

I/O 109 may include a microphone, keypad, touch screen, and/or stylus through which a user of insurance premium determination control unit 101 may provide input, and may also include one or more speakers for providing audio output and a video display device for providing textual, audiovisual and/or graphical output. Software may be stored within memory 115 to provide instructions to processor 103 for enabling control unit 101 to perform various functions. For example, memory 115 may store software used by the control unit 101, such as an operating system 117, application programs 119, and an associated internal database 121. In some implementations, the database 121 can be used to store information relating to the replacement cost of an insured entity. For example, data pertaining to material costs, equipment costs, and labor costs required to rebuild an insured home can be stored in the database 121.

The control unit 101 may operate in a networked environment supporting connections to one or more remote computers, such as terminals 141 and 151. The terminals 141 and 151 may be personal computers or servers that include many or all of the elements described above relative to control unit 101. The network connections depicted in FIG. 1 include a local area network (LAN) 125 and a wide area network (WAN) 129, but may also include other networks. When used in a LAN networking environment, the control unit 101 is connected to the LAN 125 through a network interface or adapter 123. When used in a WAN networking environment, the control unit 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the control unit 101 according to an illustrative embodiment of the disclosure may include computer executable instructions for invoking functionality related to determining insurance premiums using an amount of insurance and replacement cost information associated with an insured entity.

Figure 2:
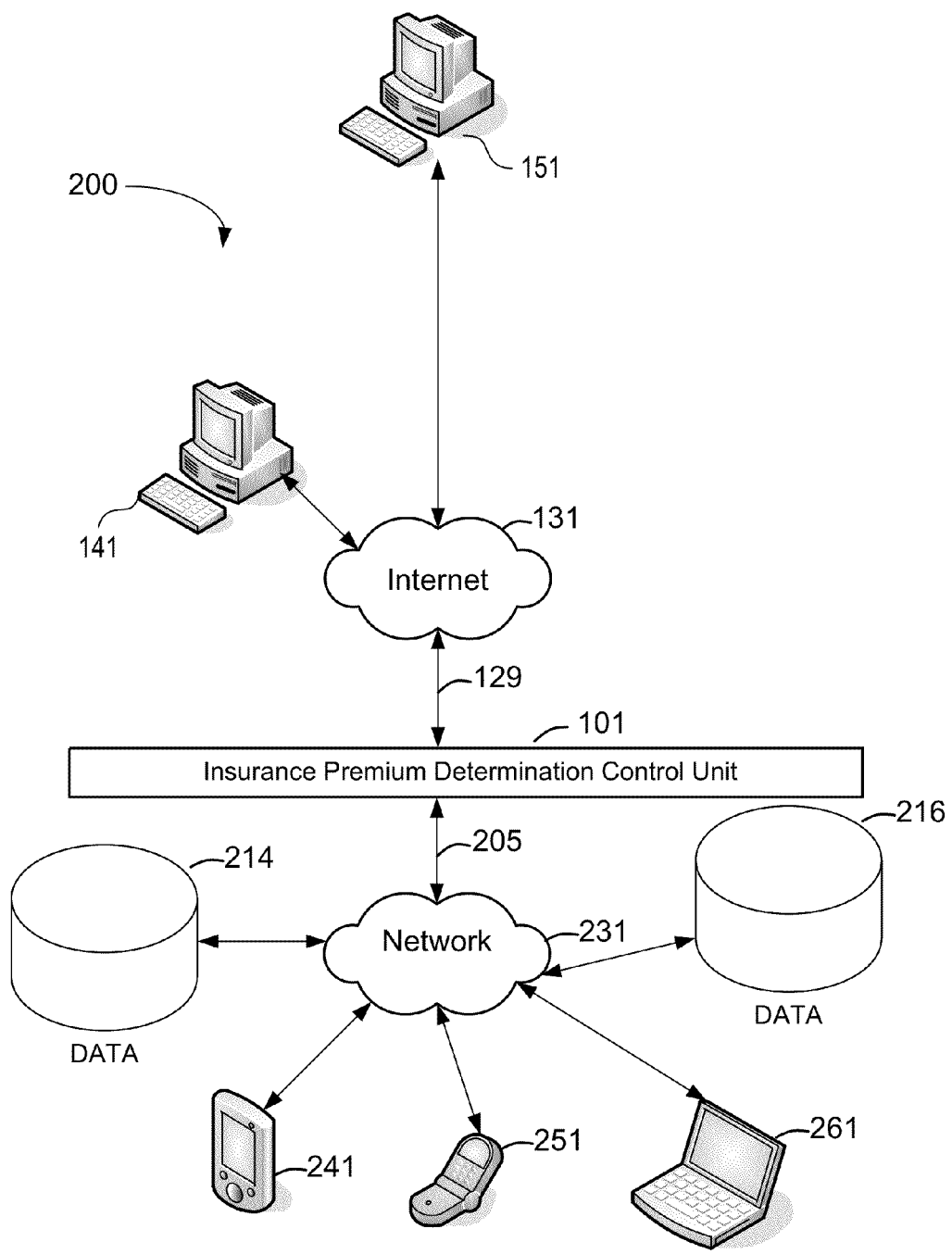
FIG. 2 is an illustrative block diagram of workstations and servers that may be used to implement the processes and functions of certain aspects of the present disclosure.

Referring to FIG. 2, an example of a suitable operating environment in which various aspects of the disclosure may be implemented is shown in the schematic diagram. The computing system 200 is illustrated in one example of a suitable operating environment and is not intended to suggest any limitation as to the scope of use or functionality of the computing system 200. Computing system 200 may also include mobile terminals or phones such as 241 and 251 or laptops such as 261 for use in communication with control unit 101 through network 231.

The computing system 200 may also be comprised of one or more databases 214, 216 coupled to a control unit 101. The communication between the databases 214, 216 and the control unit 101 may be through wired or wireless communication networks (depicted by network cloud 231 via communication link 205). The control unit 101 and other devices (e.g., databases 214, 216) may be connected to one or more of the networks via twisted pair wires, coaxial cable, fiber optics, radio waves or other media. The term "network" as used herein and depicted in the drawings should be broadly interpreted to include not only systems in which remote databases are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

The plurality of databases 214, 216 may contain information belonging to or maintained by an insurance company, government entity, and/or third-party entity. For privacy protection reasons, access to the information in these databases 214, 216 may be restricted to only authorized computing devices and for only permissible purposes. For example, a database 214 may comprise a computer internal to an insurance company that contains customer policy information, such as information about entities insured by the customer (e.g., homes, cars, boats, etc.) or insurance premium information for one or more policies held by the customer. The database 214 may also contain information, including but not limited to, the customer's relevant amount of insurance and/or deductibles with insurance carriers, the customer's address information and other personal information, replacement cost information for insured entities, and any other information apparent to one skilled in the art.

In another example, database 214 may also contain predefined business rules and other information to enable the methods disclosed herein. For example, the database 214 may contain data related to replacement costs for an insured entity, such as building material costs, labor costs, or the market value of vehicles. This data may be used, among other things, to optimize the business rules and/or insurance premium determination techniques used in the method and systems disclosed herein.

Furthermore, database 216 may comprise an external computer with a large memory store, and run a system, such as a premium determining system, for enabling the determination and adjustment of insurance premiums based on amount of insurance and one or more replacement cost factors associated with a particular insured entity. Database 216 may contain information about replacement cost information retrieved from sources, such as labor cost databases, and material cost databases. In some implementations, labor and material cost information stored in database 216 may include location information so that differences in labor and material costs in various geographic areas can be identified.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Insurance companies provide insurance policies to individuals and businesses to cover loss or damage of property. In return, the customer remits payments to the insurance companies. These payments may be done on a scheduled basis, such as monthly or yearly. The insurance policies may be specific and only cover loss or damage to the property from certain types of occurrences. Alternatively, the insurance policies may be broad and cover loss or damage to the property from many different occurrences. Types of insurance policies include vehicle insurance (including personal automobile, motorcycle, boat, and various commercial lines, etc.), homeowner insurance, renter's insurance, and commercial property insurance (e.g., landlord policies, etc.). Insured entities can include homes, commercial properties, other buildings, land, vehicles (automobiles, motorcycles, boats, snow mobiles, etc.), and personal property (jewelry, furniture, televisions, computers, other electronics). As used here, a customer may include any party that may report a loss to the insurance company, including, but not limited to, an insured party, third-party claimant, insurance agent, attorney, or public adjuster.

When loss or damage occurs to the property, the customer may contact the insurance company to report the loss or damage and make a claim against their policy in order to obtain compensation for the loss or damage to the property. Resources within or external to the insurance company may handle the insurance claim and determine the amount, if any, of compensation due to the customer. Typically, insurance companies provide insurance to a plurality of individuals and businesses within a region.

The following description illustrates examples of insurance premium determination processes in accordance with various embodiments of the disclosure. One skilled in the art will appreciate that aspects of the disclosure may be applied to various lines of insurance in different embodiments, including but not limited to, vehicle insurance (including personal automobile, motorcycle, boat, and various commercial lines, etc.), homeowner insurance, renters insurance, commercial property insurance, and other lines and insurance products. It should be noted that in the discussion that follows, a particular application may be described for the purpose of illustration. However, such discussion is for the purpose of describing potential uses of the invention and is not intended to limit the present invention's scope.

Referring again to FIG. 2, the insurance premium determination control unit 101 can determine an insurance rating plan for determining insurance premium rates offered to insurance customers. Several factors can be used in determining an insurance rating plan for a policy. For example, the probability of an accident occurring can be used in determining an auto insurance rate. In some cases, this metric can be further delineated to allow the insurance premium determination control unit 101 to use information on the probability accidents of various damage severities occurring. For example, the probability of an accident in which more than $25,000 in damage occurs can be compared to the probability of an accident in which less than $25,000 worth of damage occurs when determining a premium for the auto insurance policy.

Information that is used in determining insurance premiums can be stored in the databases 214, 216 and accessed by the insurance premium determination control unit 101 through the network 231. In some instances, information that is stored in the databases 214, 216 is gathered from outside sources and stored in the databases 214, 216 to be used for calculating insurance rates (premiums), processing insurance claims, communicating with insurance clients, or other related actions. For example, an insurance customer can use the terminal 151 to connect to communicate with the insurance premium determination control unit 101 through the internet 131. The customer can provide information such as name, address, telephone number, email address, age, occupation, and type of insurance desired. This information can be stored in the databases 214, 216 by the insurance premium determination control unit 101. The user can also indicate a desired deductible for an insurance policy. For example, a $500 deductible for an automobile collision policy.

The user can also indicate an amount of insurance desired. For example, the user can indicate an amount of insurance of $400,000 for a home insurance policy. In some implementations, an amount of insurance is selected by the user such that the amount of insurance is greater than a replacement cost for an insured entity. For example, the replacement cost of a house may be $330,000 and the home owner may select an amount of insurance of $450,000 for an insurance policy covering the house. In some instances, a mortgage or loan holder for an insured entity (e.g., commercial or residential property, or vehicle) may require an insurance policy holder to select an amount of insurance that is greater than a replacement cost for an insured entity. For example, a home mortgage holder may require a policy holder to select an amount of insurance that is equal to the amount owed on the mortgage even if the amount owed on the mortgage is greater than the replacement cost of the home.

The information provided by the customer can be stored in the databases 214, 216 and associated with one or more insurance policies held by the customer. This information can then be used by the insurance premium determination control unit 101 in determining insurance premiums. For example, a customer's address and other personal information can be used to identify the premium associated with policies that have a varying risk of accidents. For example, a 22-year-old living in Los Angeles may have an increased risk of being involved in a traffic accident over a 45-year-old living in rural Montana.

In some implementations, information stored in the databases 214, 216 can be used to identify further information that can be stored and used in determining insurance premiums. For example, an address for an insured property can be used to identify a region of the country in which the property is located. Information can then be gathered from various sources as to a risk of loss of or damage to the property due to natural disasters occurring in the identified geographic region in which the property is located.

In some implementations, information pertaining to replacement cost for an insured entity can be received and stored in the databases 214, 216. A number of replacement cost factors can be used in determining a replacement cost for an insured entity. For example, when determining a replacement cost for an insured home, commercial building, or other structure, labor costs and material costs can be used in determining a replacement cost. As another example, when determining a replacement cost for a vehicle, an average market price for a vehicle having the same make, model, and year as the insured vehicle can be used as a factor in determining a replacement cost. As yet another example, shipping costs for a replacement item or replacement materials can be used when determining a replacement cost for an insured entity. Replacement cost factor data can be received by the insurance premium determination control unit 101 from the databases 214, 216 or from other information sources, such as databases connected to the internet 131.

In some cases, the insurance premium determination control unit 101 can access one or more information sources to identify construction labor costs for a geographic region in which an insured property (e.g., home, commercial property) is located. For example, construction labor costs may be greater in Atlanta than in Houston. The insurance premium determination control unit 101 can for example connect to a database of construction labor cost information through the internet 131 or the network 231 and use this information in calculating a replacement cost for the insured property. The labor cost information can be combined with information on the total amount of time required to build or rebuild a property similar to the insured property in order to calculate an estimated total labor cost for replacing the insured property.

The insurance premium determination control unit 101 can additionally receive information on construction material costs for a geographic region in which an insured property is located. For example, lumber may be more expensive in New York than in Wisconsin. As another example, steel may be less expensive in Pennsylvania than in Arizona. In some implementations, the databases 214, 216 can store information pertaining to materials associated with an insured property. For example, information on whether an insured property is primarily constructed from brick, wood, steel, concrete, or another material can be stored in the databases 214, 216. If an insured property is identified as having a brick exterior and mostly wooden interior, material costs for the types of brick and wood from which the insured property is constructed can be identified for the region in which the property is located. This information can then be used in calculating a replacement materials cost for the insured property. Additional materials, such as brand or style of carpet, light fixture brand/type, appliance brand/type, plumbing fixture brand/type, or other materials used in the construction of the insured property can also be stored in the databases 214, 216. This information can be compared to information on materials costs for each of the identified materials and used in calculating a replacement materials cost for the insured property.

In some implementations, information on labor costs, material costs, and other replacement costs can be updated. In some cases, this updating of cost information can occur on a regular basis, such as quarterly or annually. Updated information as to material costs and labor costs in a region can be identified and used to update a replacement cost for an insured property. In some cases, if renovations have been made to an insured property, updated material information and replacement labor requirement information can be stored in the databases 214, 216 and used to calculate an updated replacement cost for an insured property.

In some implementations, information relating to the price of a replacement item to replace an insured entity can be received by the insurance premium determination control unit 101. For example, the average market price for a car of the same make, model, and year as well as a similar mileage as an insured vehicle can be identified. In some implementations, the average market price of a replacement vehicle can be determined based on a geographic region in which the insured vehicle is primarily located (e.g., based on the home address of the customer holding the insurance policy for the vehicle). In some implementations, this identified average market price can be used as a replacement cost for the vehicle. In some implementations, the replacement cost for a vehicle is based on the identified average market price. In some implementations, market price information can be updated to determine an updated replacement cost for an insured vehicle. In some implementations, market price information can be updated on a periodic basis, such as quarterly or annually. In some aspects, a replacement cost of an item may represent the market value of the item purchased new or its depreciated value purchased used.

In some instances, the geographic location of an insured entity is not used in identifying a replacement cost for an insured entity. For example, in the case of jewelry or other smaller insured items, replacement items can be purchased from a wide variety of geographic locations and shipped to the location of a customer. In some such instances, a number of replacement costs for an insured item can be identified and a best price can be selected from among them to identify a replacement cost for the insured item. In some implementations, shipping costs for a replacement item can be identified and used in calculating a replacement cost for an ensured entity. Prices for replacement items and shipping costs for replacement items can be updated so that an updated replacement cost can be determined. In some implementations, the updating of the replacement item prices and shipping costs can occur on a periodic basis, such as quarterly or annually.

The insurance premium determination control unit 101 can use replacement cost factors associated with an insurance policy for an insured entity to determine a replacement cost for the insured entity. The insurance premium determination control unit 101 can use the replacement cost in combination with the amount of insurance for the insurance policy to determine an insurance premium for the insurance policy. In some implementations, the determined insurance premium can be billed to the holder of the insurance policy on a regular basis (e.g., monthly, every six months, annually, etc.). In some implementations, replacement cost factor data can be updated; this updated replacement cost factor data can be used to determine an updated replacement cost for an insured entity which can then be used, in combination with the amount of insurance for the insured entity, to determine an updated insurance premium for the insurance policy. In some implementations, the amount of insurance for the insurance policy can be changed (for example, at the request of the policy holder) and the changed amount of insurance can be used in combination with the replacement cost of the insured entity to determine an updated insurance premium for the insurance policy.

In some aspects, the replacement cost data may be determined from information obtained through various online sources (e.g., home listing sources, etc.) and/or through modeling (e.g., of houses in a neighborhood).

In some implementations, one or more temporary premiums can be determined and used to determine a final premium for an insurance policy. For example, a first temporary premium can be calculated based on the replacement cost for an insured entity covered by the insurance policy. A second temporary premium can then be calculated based on the amount of insurance for the insurance policy. In some implementations in which the amount of insurance is greater than the replacement cost, the first temporary premium will be less than the second temporary premium. In some implementations, a final premium can be selected such that the final premium is less than the second premium and greater than the first premium.

In some implementations, the insurance premium determination control unit 101 can subtract the replacement cost from the amount of insurance for an insured entity to determine the difference between the two. The insurance premium determination control unit 101 can then use the difference to determine what percentage of the amount of insurance is coverage that exceeds the replacement cost. This identified percentage can then be used to calculate a final premium such that the final premium is greater than the first premium and less than the second premium.

In some implementations, several insurance premium portions can be calculated and the insurance premium portions can be summed to determine the final premium for the insurance policy. For example, a first premium portion can be determined based on the replacement cost. A second premium portion can then be determined based on the difference between the amount of insurance and the replacement cost. In some implementations, the second premium portion can be determined such that the ratio between the first premium portion and the replacement cost is greater than the ratio between the second premium portion and the difference between the amount of insurance and the replacement cost. In some implementations, information regarding the likelihood of an insurance claim paying out an amount greater than the replacement cost can be used in determining the second premium portion. The first and second premium portions can be summed to determine the final premium portion.

In yet other implementations, a ratio between the amount of insurance and the replacement cost for one or more entities insured under a single insurance policy may be determined and used as a rating variable for insurance premium determination. In this aspect, the amount of insurance may represent a customer choice for the amount of insurance for insuring one or more entities (e.g., home, automobile, etc.) covered under a single insurance policy whereas a replacement cost may represent a calculated value for replacing the entities. When the ratio between the amount of insurance and the replacement cost is greater than one for a given scenario, insurance premium determination control unit 101 may determine that the insured party may not be receiving a significant additional benefit for the amount of coverage between the replacement cost and the amount of insurance. On the other hand, when the ratio between the amount of insurance and the replacement cost is less than one for a given scenario, insurance premium determination control unit 101 may determine that an insured party should receive additional insurance coverage for one or more entities covered under a single insurance policy and may recommend or require various insurance products to the insured party.

In some aspects, when the ratio between the amount of insurance for insuring one or more entities covered under a single insurance policy and the replacement cost for replacing the entities is greater than one, a final premium rate for insuring the entities may be calculated by multiplying the premium rate for insuring the entities at the replacement cost by a predetermined value greater than one but less than the value represented by the ratio between the amount of insurance for insuring the entities and the replacement cost for replacing the entities.

For instance, assume that a customer of an insurance company buys $400,000 worth of insurance on his home. Assume also that insurance premium determination control unit 101 determines that the replacement cost of the home in the event of a total loss is $300,000. In this example, the ratio of the amount of insurance to the replacement cost of the home is $400,000 divided by $300,000, which is 1.33. Assume further that in conventional implementations, the premium amount for this home would be based on the amount of insurance (i.e., $400,000) without regard to the replacement cost of the home (assuming that the amount of insurance is greater than or equal to the replacement cost of the home). In accordance with various aspects of the disclosure, insurance premium determination control unit 101 may determine the premium amount for $400,000 worth of insurance in other ways. For instance, insurance premium determination control unit 101 may determine that the customer may be over-insured for his home (e.g., by $100,000), and given that the risk of losses above $300,000 would be minimal for the insurance company, insurance premium determination control unit 101 may offer an incentive to the customer by charging less than the full premium amount for $400,000 worth of insurance.

For instance, assume, in the above example, that the monthly premium amount on $300,000 worth of home insurance is $100. In conventional implementations, the premium amount increases at a decreasing rate as the amount of insurance increases. Thus, in conventional implementations, the premium amount for a $400,000 home would be somewhere between $100 and $133 ($100 times ($400,000/$300,000)=$133). In other words, the premium amount for a $300,000 home (i.e., $100) would be multiplied by some factor between 1 and 1.33 ($400,000/$3000,000) to determine the premium amount for a $400,000 home. Assume that, in this example, this factor is 1.20. Thus, in conventional implementations for this example, the monthly premium amount on a $400,000 home would be $120 (100 times 1.20). In accordance with novel aspects of the disclosure, for this example, insurance premium determination control unit 101 may select a factor less than 1.20 (e.g., 1.1) and may use this factor to be multiplied by $100 ($100*1.1=$110) to determine the monthly premium amount on $400,000 worth of home insurance if the replacement cost is $300,000. This selected factor may be obtained from various sources available to insurance premium determination control unit 101, including tables from rating manuals (which may vary from state to state) used by the insurance company. Thus, in this example, when compared to conventional implementations, an insurance customer may realize a $10 monthly premium discount (i.e., $120–$110=$10) for buying $400,000 worth of home insurance on a home whose replacement cost has been calculated to be $300,000.

Figure 3:
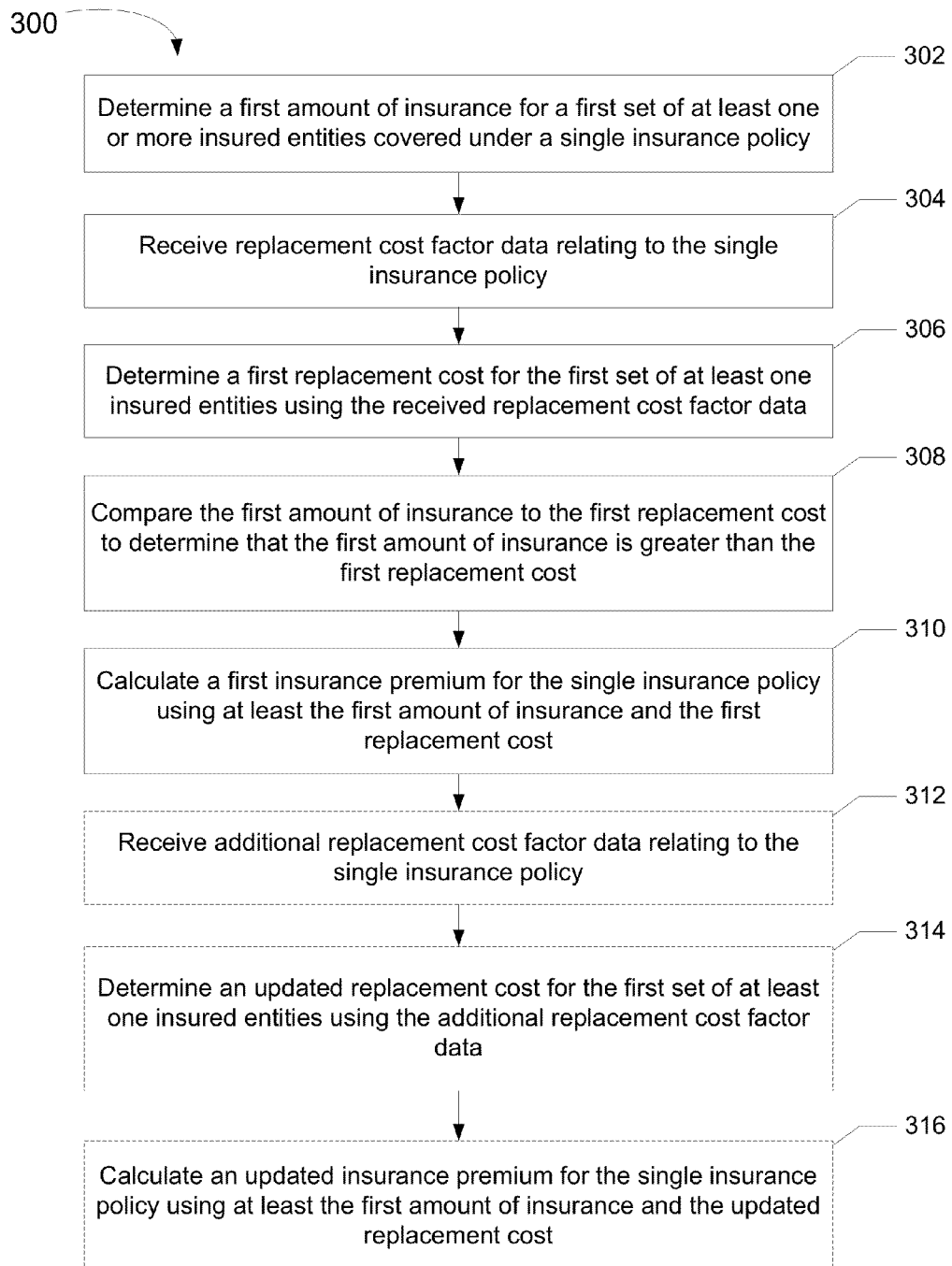
FIG. 3 shows a flow diagram of a process associated with insurance premium determination in accordance with at least one aspect of the disclosure.

Turning now to FIG. 3, an example process 300 is shown for determining an insurance premium for an insurance policy in accordance with an example embodiment. The method may be implemented by the insurance premium determination control unit 101, one or more computers, or other apparatus. The order of the steps depicted in FIG. 3 may be rearranged, one or more steps may be repeated in sequential and/or non-sequential order, and/or one or more steps may be omitted. Further, other steps may be added to the process 300.

The process 300 includes a step 302 of determining a first amount of insurance for a first set of at least one or more insured entities covered under a single insurance policy. For example, three automobiles may be covered under a single insurance policy. As another example, a house as well as the land on which the house is located and the fixtures, appliances, furnishings, and other items within the house may be covered under a single insurance policy. In some implementations, an amount of insurance for the single insurance policy can be determined by accessing a database that stores insurance information for the single insurance policy.

In some implementations, an amount of insurance may be indicated by an insurance policy holder of the single insurance policy. For example, the insurance policy holder may indicate an amount of insurance using a personal computer and the amount of insurance can be associated with the single insurance policy in a database. As another example, the policy holder can indicate the amount of insurance to an insurance company employee over the phone, and the employee can enter the amount of insurance information into a database. In some implementations, the amount of insurance can be set according to requirements of a mortgage or loan holder for the at least one insured entities covered by the single insurance policy.

At step 304, replacement cost factor data relating to the single insurance policy is received. For example, replacement cost factor data can be retrieved from one or more databases. In some implementations, databases containing replacement cost factor data can be accessed through the internet, or through a W.A.N. or L.A.N. In some implementations, replacement cost factor data can include material costs, labor costs, replacement item costs, or shipping costs. In some implementations, replacement cost factor data can be identified based on a geographic region in which an insured entity is primarily located. For example, costs for replacement materials and construction labor can be identified for a geographic region in which an insured building is located.

In some implementations, replacement cost factor data can include information about an insured entity, such as materials used in the construction of a house or other building, or information on appliances, fixtures, carpeting, or other aspects of a building.

At step 306, a first replacement cost for the first set of at least one insured entities is determined using the received replacement cost factor data. For example, information on labor costs for a particular geographic region can be combined with information on average construction times for structures similar to an insured structure to determine an estimated total labor cost for replacing the insured structure. As another example, costs for materials that are used in the construction of a building can be used in determining the replacement cost of the building. As another example, average retail price as well as shipping costs for an insured necklace can be used in determining a replacement cost for the insured necklace.

At step 308, the first amount of insurance is compared to the first replacement cost to determine that the first amount of insurance is greater than the replacement cost. For example, the insurance premium determination control unit 101 can subtract the first replacement cost from the first amount of insurance and inspect the result to see if the result is a positive number. Upon identifying the result as a positive number, the insurance premium determination control unit 101 can determine that the amount of insurance is greater than the replacement cost.

At step 310, a first insurance premium for the single insurance policy is calculated using at least the first amount of insurance and the first replacement cost. In some implementations, this calculation can be performed responsive to the determination of step 308. In some implementations, the first insurance premium can be calculated such that the calculated first insurance premium is less than a second insurance premium for a second set of at least one insured entities for which a second amount of insurance and a second replacement cost are both equal to the first amount of insurance. In some implementations, the first insurance premium can be calculated such that the calculated first insurance premium is greater than a third insurance premium for a third set of at least one insured entities for which a third amount of insurance and a third replacement cost are both equal to the first replacement cost.

In some implementations, the first insurance premium can be calculated based on the difference between the first amount of insurance and the first replacement cost. For example. The difference can be divided by the replacement cost to determine the degree to which the amount of insurance exceeds the replacement cost. This percentage can then be used to calculate the first insurance premium.

In some implementations, the first insurance premium can be determined by determining premium portions and summing the premium portions. For example, a first premium portion can be determined based on the first replacement cost and other information associated with the insurance policy (for example, risk factor information). A second premium portion can then be determined based on the difference between the first amount of insurance and the first replacement cost. In some implementations, the second premium portion can be determined such that the ratio between the second premium portion and the difference is less than the ratio between the first premium portion and the first replacement cost. In some implementations, the second premium portion can be determined at least partially based on a probability that an insurance claim for the at least one insured entities would pay out an amount greater than the replacement cost.

In addition to the above mentioned steps, in some implementations, the process 300 can include one or more optional steps including optional step 312 of receiving additional replacement cost factor data relating to the single insurance policy. The additional replacement cost factor data can include material costs, labor costs, replacement item costs, or shipping costs as described above with reference to step 304. The additional replacement cost factor data can be updated to reflect changes in material, labor, or other replacement costs since the initial replacement cost factor data was received at step 304. For example, the replacement cost for a car or other vehicle will generally depreciate from year to year. An updated replacement cost for an insured vehicle can be received and a database can be updated with the new replacement cost. As another example, construction labor costs in a particular geographic region may increase between two time periods. The current construction labor cost figures can be obtained, stored, and used in determining future premium rates.

At optional step 314, an updated replacement cost for the first set of at least one insured entities is determined using the additional replacement cost factor data. For example, updated information on labor costs for a particular geographic region can be combined with updated information on average construction times for structures similar to an insured structure to determine an updated estimated total labor cost for replacing the insured structure. The updated total labor cost can be combined with updated materials cost information to determine an updated replacement cost for the at least one insured entity. As another example, an updated average retail price as well as updated shipping costs for an insured work of art can be used in determining a replacement cost for the insured work of art.

At optional step 316, an updated insurance premium for the single insurance policy is calculated using at least the first amount of insurance and the updated replacement cost. In some implementations, this calculation can be performed responsive a determination that the first amount of insurance is greater than the updated replacement cost. In some implementations, the updated insurance premium can be calculated such that the updated insurance premium is less than a fourth insurance premium for a fourth set of at least one insured entities for which a fourth amount of insurance and a fourth replacement cost are both equal to the first amount of insurance. In some implementations, the updated insurance premium can be calculated such that the updated insurance premium is greater than a fifth insurance premium for a fifth set of at least one insured entities for which a fifth amount of insurance and a fifth replacement cost are both equal to the updated replacement cost.

In some implementations, the updated insurance premium can be calculated based on the difference between the first amount of insurance and the updated replacement cost. For example, the difference can be divided by the replacement cost to determine the degree to which the amount of insurance exceeds the updated replacement cost. This percentage can then be used to calculate the updated insurance premium.

In some implementations, the updated insurance premium can be determined by determining premium portions and summing the premium portions. For example, a first premium portion can be determined based on the updated replacement cost and other information associated with the insurance policy (for example, risk factor information). A second premium portion can then be determined based on the difference between the first amount of insurance and the updated replacement cost. In some implementations, the second premium portion can be determined such that the ratio between the second premium portion and the difference is less than the ratio between the first premium portion and the updated replacement cost. In some implementations, the second premium portion can be determined at least partially based on a probability that an insurance claim for the at least one insured entities would pay out an amount greater than the updated replacement cost.

In some implementations, one or more steps of the process 300 can be omitted or repeated. For example, steps 312 to 316 can be repeated to obtain further updated replacement costs and updated insurance premiums. In some implementations, steps 312 to 316 can be repeated on a periodic basis, such as quarterly or annually. Additionally, the steps of the process 300 may be performed in a different order than that shown in FIG. 3. For example, in some implementations, step 302 of determining a first amount of insurance can be performed after step 306 of determining a first replacement cost. As another example, in some implementations, the step 312 of receiving additional replacement cost factor data may be performed before step 310 of calculating a first insurance premium. In some implementations, the process 300 may include additional steps.

While specific examples have been described, those skilled in the art will appreciate that there are numerous variations and permutations of the above-described systems and methods that fall within the spirit and scope of the disclosure. Additionally, while specific examples of methods and steps have been disclosed, steps may be omitted or steps may be reordered, while still accomplishing similar results. Other features and advantages of aspects of the disclosure will be apparent from the description, drawings, and claims.

What is claimed is:

1. An insurance premium determination system comprising:
    an input module comprised of at least one of a keypad, mouse, and graphical user display,
    a modem configured to receive a first desired amount of insurance for insuring a home and to receive replacement cost factor data associated with the home;
    a first data store configured to store the first desired amount of insurance and the replacement cost factor data;
    a second data store configured to store personal information associated with a plurality of customers;
    a third data store configured to store predefined business rules that specify which information in the first data store and the second data store will be used for determining an insurance premium associated with insuring the home;
    a data analysis processor configured to analyze the replacement cost factor data to determine a first replacement cost for the home;
    an insurance premium determination processor configured to (1) determine that the first desired amount of insurance for insuring the home is greater than the replacement cost, (2) based on the determination, calculate a first insurance premium associated with insuring the home with the first desired amount of insurance, and (3) confirm that the first insurance premium is less than a second insurance premium for the home for which a second desired amount of insurance and a second replacement cost are both equal to the first desired amount of insurance;
    an output module including at least a graphical user interface configured to output the first insurance premium to a customer; and
    a network adapter configured to connect the first data store, the second data store, and the third data store to the input module, data analysis processor, insurance premium determination processor, and the output module.

2. The insurance premium determination system of claim 1, where the calculated first insurance premium is greater than a third insurance premium for which a third desired amount of insurance and a third replacement cost are both equal to the first replacement cost.

3. The insurance premium determination system of claim 2, where a difference between the third insurance premium and the first insurance premium is at least partially based on at least one of a difference or ratio between the first amount of insurance and the first replacement cost.

4. The insurance premium determination system of claim 1, where the modem is further configured to receive additional replacement cost factor data.

5. The insurance premium determination system of claim 4, where the data analysis processor is further configured to use the additional replacement cost factor data to determine an updated replacement cost.

6. The insurance premium determination system of claim 5, where the insurance premium determination processor is further configured to: calculate an updated insurance premium using at least the first desired amount of insurance and the updated replacement cost.

7. The insurance premium determination system of claim 1, where the replacement cost factor data includes labor cost data.

8. The insurance premium determination system of claim 1, where the replacement cost factor data includes material cost data.

9. The insurance premium determination system of claim 1, where the replacement cost factor data includes data that is specific to a particular geographic region.

10. An insurance premium determination system comprising:
    an input module comprised of at least one of a keypad, mouse, and graphical user display,
    a communication device configured to receive a first desired amount of insurance for insuring a home and to receive replacement cost factor data associated with the home;
    a data analysis processor configured to analyze the replacement cost factor data to determine a first replacement cost for the home;
    an insurance premium determination processor configured to (1) determine that the first desired amount of insurance for insuring the home is greater than the replacement cost, (2) based on the determination, calculate a first insurance premium associated with insuring the home with the first desired amount of insurance, and (3) confirm that the first insurance premium is less than a second insurance premium for the home for which a second desired amount of insurance and a second replacement cost are both equal to the first desired amount of insurance; and
    an output module including at least a graphical user interface configured to output the first insurance premium to a customer.

11. The insurance premium determination system of claim 10, further comprising: a first data store configured to store the first desired amount of insurance and the replacement cost factor data.

12. The insurance premium determination system of claim 11, further comprising: a second data store configured to store personal information associated with a plurality of customers.

13. The insurance premium determination system of claim 12, further comprising: a third data store configured to store predefined business rules that specify which information in the first data store and the second data store will be used for determining an insurance premium associated with insuring the home.

14. The insurance premium determination system of claim 10, where the calculated first insurance premium is greater than a third insurance premium for which a third desired amount of insurance and a third replacement cost are both equal to the first replacement cost.

15. The insurance premium determination system of claim 10, where the replacement cost factor data includes labor cost data.

16. The insurance premium determination system of claim 10, where the replacement cost factor data includes material cost data.

17. The insurance premium determination system of claim 10, where the replacement cost factor data includes data that is specific to a particular geographic region.

18. An apparatus comprising:
    an input module comprised of at least one of a keypad, mouse, and graphical user display,
    a modem configured to receive a first desired amount of insurance for insuring a home and to receive replacement cost factor data associated with the home;
    a first data store configured to store the first desired amount of insurance and the replacement cost factor data;
    a second data store configured to store personal information associated with a plurality of customers;
    a third data store configured to store predefined business rules that specify which information in the first data store and the second data store will be used for determining an insurance premium associated with insuring the home;
    a first data analysis processor configured to interface with the second data store to determine a geographical region of the home and to analyze material costs, labor costs, replacement item costs, and shipping costs associated with the geographical region of the home;
    a second data analysis processor configured to analyze the replacement cost factor data and the material costs, labor costs, replacement item costs, and shipping costs to determine a first replacement cost for the home;
    an insurance premium determination processor configured to (1) determine that the first desired amount of insurance for insuring the home is greater than the replacement cost, (2) based on the determination, calculate a first insurance premium associated with insuring the home with the first desired amount of insurance, and (3) confirm that the first insurance premium is less than a second insurance premium for the home for which a second desired amount of insurance and a second replacement cost are both equal to the first desired amount of insurance;
    an output module including at least a graphical user interface configured to output the first insurance premium to a customer; and
    a network adapter configured to connect the first data store, the second data store, and the third data store to the input module, the first data analysis processor, the second data analysis processor, the insurance premium determination processor, and the output module.

19. The apparatus of claim 18, where the first insurance premium is greater than a third insurance premium for which a third desired amount of insurance and a third replacement cost are both equal to the first replacement cost.

20. The apparatus of claim 18, where the second data analysis processor is further configured to use additional replacement cost factor data to determine an updated replacement cost for the home.

* * * * *

UNITED STATES PATENT AND TRADEMARK OFFICE
CERTIFICATE OF CORRECTION

PATENT NO. : 8,719,134 B1  
APPLICATION NO. : 13/722044  
DATED : May 6, 2014  
INVENTOR(S) : Eric Huls et al.

Page 1 of 1

It is certified that error appears in the above-identified patent and that said Letters Patent is hereby corrected as shown below:

On the Title page in item (72) providing the inventorship, please delete "Pradraic Sheerin" and replace with --Padraic Sheerin--

Signed and Sealed this  
Fourteenth Day of July, 2015

Michelle K. Lee  
*Director of the United States Patent and Trademark Office*